United States Patent
Maeda et al.

(10) Patent No.: US 7,901,803 B2
(45) Date of Patent: Mar. 8, 2011

(54) PERPENDICULAR MAGNETIC RECORDING MEDIUM, MANUFACTURING METHOD THEREFOR, AND MAGNETIC READ/WRITE APPARATUS USING THE SAME

(75) Inventors: Tomoyuki Maeda, Kawasaki (JP); Soichi Oikawa, Tokyo (JP); Takeshi Iwasaki, Yokohama (JP); Futoshi Nakamura, Ichikawa (JP); Hiroshi Sakai, Ichihara (JP); Kenji Shimizu, Chiba (JP); Akira Sakawaki, Ichihara (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 1031 days.

(21) Appl. No.: 10/574,573

(22) PCT Filed: Oct. 5, 2004

(86) PCT No.: PCT/JP2004/015007
§ 371 (c)(1),
(2), (4) Date: Apr. 4, 2006

(87) PCT Pub. No.: WO2005/034095
PCT Pub. Date: Apr. 14, 2005

(65) Prior Publication Data
US 2007/0065955 A1    Mar. 22, 2007

Related U.S. Application Data

(60) Provisional application No. 60/509,996, filed on Oct. 10, 2003.

(30) Foreign Application Priority Data

Oct. 6, 2003   (JP) .............................. 2003-347192

(51) Int. Cl.
G11B 5/66        (2006.01)
G11B 5/738      (2006.01)

(52) U.S. Cl. .................. 428/831.2; 428/836.2; 360/131
(58) Field of Classification Search .................... None
See application file for complete search history.

(56) References Cited

U.S. PATENT DOCUMENTS

| | | | |
|---|---|---|---|
| 5,652,054 A * | 7/1997 | Kikitsu et al. | 428/328 |
| 5,736,013 A * | 4/1998 | Ranjan et al. | 204/192.2 |
| 6,696,172 B2 * | 2/2004 | Oikawa et al. | 428/831 |

(Continued)

FOREIGN PATENT DOCUMENTS

| | | |
|---|---|---|
| JP | 5-143953 A | 6/1993 |
| JP | 9-204651 A | 8/1997 |
| JP | 2000-182233 A | 6/2000 |
| JP | 2001-14662 A | 1/2001 |

(Continued)

OTHER PUBLICATIONS

Derwent Abstract Translation of JP-2002-334424 A (Derwent-Acc-No. 2003-346099).*

Primary Examiner — Kevin M Bernatz
(74) Attorney, Agent, or Firm — Sughrue Mion, PLLC

(57) ABSTRACT

A perpendicular magnetic recording medium includes: a substrate; at least one underlayer formed above the substrate; and a perpendicular magnetic recording layer formed above the at least one underlayer, an easy magnetization axis of the perpendicular magnetic recording layer being oriented perpendicular to the substrate, the perpendicular magnetic recording layer including magnetic crystal particles and grain boundaries surrounding the magnetic crystal particles, wherein the grain boundaries contain an oxide of silicon and at least one element selected from the group consisting of Li, Na, K, Rb, Cs, Ca, Sr, and Ba, and the ratio of a total amount of substance of Si, Li, Na, K, Rb, Cs, Ca, Sr, and Ba in the perpendicular magnetic recording layer is no less than 1 mol % and no more than 20 mol %.

9 Claims, 4 Drawing Sheets

U.S. PATENT DOCUMENTS

| | | |
|---|---|---|
| 7,183,011 B2 | 2/2007 | Nakamura et al. |
| 7,429,427 B2 * | 9/2008 | Wu et al. ............... 428/836.2 |
| 2001/0036564 A1 | 11/2001 | Ohmori |
| 2002/0160232 A1 * | 10/2002 | Shimizu et al. ....... 428/694 TM |
| 2002/0172842 A1 | 11/2002 | Honda et al. |
| 2003/0170500 A1 | 9/2003 | Shimizu et al. |
| 2003/0215675 A1 | 11/2003 | Inaba et al. |
| 2003/0219630 A1 * | 11/2003 | Moriwaki et al. ....... 428/694 R |

FOREIGN PATENT DOCUMENTS

| | | | |
|---|---|---|---|
| JP | 2001-43526 A | | 2/2001 |
| JP | 2001-291230 A | | 10/2001 |
| JP | 2001-351217 A | | 12/2001 |
| JP | 2002-25030 A | | 1/2002 |
| JP | 2002-83411 A | | 3/2002 |
| JP | 2002-208129 A | | 7/2002 |
| JP | 2002-260209 A | | 9/2002 |
| JP | 2002-329305 A | | 11/2002 |
| JP | 2002-334424 A | * | 11/2002 |
| JP | 2002-334424 A | | 11/2002 |
| JP | 2003-36525 A | | 2/2003 |
| JP | 2003-123245 A | | 4/2003 |
| JP | 2003-217107 A | | 7/2003 |

* cited by examiner

US 7,901,803 B2

PERPENDICULAR MAGNETIC RECORDING MEDIUM, MANUFACTURING METHOD THEREFOR, AND MAGNETIC READ/WRITE APPARATUS USING THE SAME

RELATED APPLICATION

This application is a national stage of International Application No. PCT/JP2004/015007 filed on Oct. 5, 2004, claiming priority based on Japanese Application No. 2003-347192 filed Oct. 6, 2003 and the benefit of U.S. Provisional No. 60/509,996 filed Oct. 10, 2003, the contents of which are incorporated herein by reference in their entirety.

TECHNICAL FIELD

The present invention relates to a particle dispersion type magnetic storage medium used in hard disk drives, to a manufacturing method therefor, and to a technology which is suitably used in a magnetic read/write apparatus.

BACKGROUND ART

Magnetic storage devices (HDDs) which is capable of reading and writing information have been commonly used in computers. Recently, advantages of such hard disk drives, including large storage capacity, a relatively low prices, fast data access, and high reliability of data retention, have broadened their application to various areas, such as household VCRs, audio appliances, or vehicle-mounted navigation systems. As the application of hard disk drives diversified, a demand for increased density became stronger, and recently, efforts to develop higher-density hard disk drives have been intensified.

At present, magnetic recording media generally mounted in a commercially available magnetic read/write apparatus are in-plane magnetic recording media. In this technique, the easy magnetization axis in the magnetic film is oriented parallel to the substrate. As used herein, the term "easy magnetization axis" denotes the axis along which magnetization is easily directed, and in the case of a Co alloy, denotes the c axis of Co having an hcp structure. In an in-plane magnetic recording medium, when the recording density is increased, the volume per bit of the magnetic film becomes too small, and thus there is the possibility that the read/write performances will deteriorate due to thermal fluctuation effects. In addition, when the recording density is increased, there is a tendency for the medium noise to increase due to the influence of the demagnetizing field at the boundary area between recording bits.

In contrast, what are termed "a perpendicular magnetic recording medium," in which the easy magnetization axis in the magnetic film is oriented substantially perpendicular to the substrate, is magnetostatically stable even when the recording density has been increased because the influence of the demagnetizing field at the boundary area between recording bits is small. Accordingly, this perpendicular magnetic recording medium has become the focus of attention in recent years as a substitute technology of the in-plane magnetic recording technique. In general, a perpendicular magnetic recording medium includes a substrate, an orientation control underlayer for orienting a magnetic recording layer, a magnetic recording layer made of a hard magnetic material, and a protective layer which protects the surface of the magnetic recording layer. Furthermore, between the substrate and the underlayer, a soft magnetism backing layer which may be responsible for gathering magnetic flux generated from the recording head may be provided.

Even in a perpendicular magnetic recording medium, noise reduction is required while maintaining thermostability in order to achieve higher recording density. A common method of noise reduction is reducing the size of magnetic crystal particles. For example, in the CoCr-based magnetic layer which is widely used at present, the size of magnetic particles are reduced by adding Ta or B, or by making non-magnetic Cr segregated at grain boundaries by heating the particles to a suitable temperature. However, since the size of the magnetic particles has yet to be satisfactorily achieved by segregation of Cr and magnetic crystal particles not being sufficiently separated spatially, magnetic interaction between particles cannot be satisfactory reduced. This, in turn, causes another problem of being unable to sufficiently reduce transition noise between recording bits.

One technique for reducing this magnetic interaction is addition of $SiO_x$ to a recording layer so as to form a magnetic recording layer having a granular structure in which magnetic crystal particles are surrounded by the additive (see Japanese Laid-Open Patent Application No. 2002-83411, for example).

Another technique to add an oxide of at least one of alkaline earth metal to a magnetic thin film is disclosed in Japanese Laid-Open Patent Application No. H09-204651.

However, since the diffusion rate of $SiO_x$ in a film is low, a sufficient amount of $SiO_x$ cannot be segregated at the boundaries of the magnetic crystal particles. As a result, a part of $SiO_x$ which has not been precipitated may form a supersaturated solid solution with the magnetic crystal particles, which lowers the crystallinity and orientation of the magnetic crystal particles, resulting in a decreased signal-noise ratio (SNR) of the reading/writing (R/W) performance.

DISCLOSURE OF INVENTION

The present invention was conceived in view of the above-described background, and an object thereof is to provide a perpendicular magnetic recording medium which has magnetic crystal particles with smaller diameters and exhibits an excellent SNR performance and enables high-density recording without having the deteriorated crystallinity and orientation of the magnetic crystal particles, and magnetic recorder employing such a magnetic recording medium.

The first aspect of the present invention is directed to a perpendicular magnetic recording medium including: a substrate;

at least one underlayer formed above the substrate; and a perpendicular magnetic recording layer formed above the at least one underlayer, an easy magnetization axis of the perpendicular magnetic recording layer being oriented perpendicular to the substrate, the perpendicular magnetic recording layer including magnetic crystal particles and grain boundaries surrounding the magnetic crystal particles, wherein the grain boundaries contain an oxide of silicon and at least one element selected from the group consisting of Li, Na, K, Rb, Cs, Ca, Sr, and Ba, and a ratio of total amount of substance of Si, Li, Na, K, Rb, Cs, Ca, Sr, and Ba in the perpendicular magnetic recording layer is no less than 1 mol % and no more than 20 mol %.

In the perpendicular magnetic recording medium described above, a ratio of total amount of substance of Li, Na, K, Rb, Cs, Ca, Sr, and Ba contained at the grain boundaries in the perpendicular magnetic recording layer may be no less than 1 mol % and no more than 30 mol %.

In the method for producing a perpendicular magnetic recording medium described above, the magnetic crystal particles may contain Co as the main component and may further contain Pt and Cr.

In the perpendicular magnetic recording described above, at least one of the at least one underlayer may contain at least one element selected from the group consisting of Ru, Ti, Rh, Pt, Pd, and Ir as a main component.

In the perpendicular magnetic recording described above, at least one of the at least one underlayer may be made of non-magnetic crystal particles containing at least one element selected from the group consisting of Ru, Ti, Rh, Pt, Pd, and Ir as a main component, and grain boundaries surrounding the non-magnetic crystal particles, and the grain boundaries may contain an oxide of at least one element selected from the group consisting of Si, Cr, and Ti.

In the perpendicular magnetic recording medium described above, the grain boundaries in the at least one underlayer may include an oxide of silicon and at least one element selected from the group consisting of Li, Na, K, Rb, Cs, Ca, Sr, and Ba.

In the perpendicular magnetic recording medium described above, a ratio of total amount of substance of Si, Li, Na, K, Rb, Cs, Ca, Sr, and Ba in the underlayer may be no less than 1 mol % and no more than 20 mol %.

In the perpendicular magnetic recording medium described above, a ratio of total amount of substance of Li, Na, K, Rb, Cs, Ca, Sr, and Ba contained at least one of at the grain boundaries in the at least one underlayer may be no less than 1 mol % and no more than 30 mol %.

The second aspect of the present invention is directed to a method for producing a perpendicular magnetic recording medium including the steps of:

forming an underlayer over a substrate, forming a perpendicular magnetic recording layer over an underlayer by evaporating a material which contains an oxide of silicon and at least one element selected from the group consisting of Li, Na, K, Rb, Cs, Ca, Sr, and Ba, the perpendicular magnetic recording layer including magnetic crystal particles and grain boundaries surrounding the magnetic crystal particles.

In the method for producing a perpendicular magnetic recording medium described above, the grain boundaries may contain an oxide of silicon and at least one element selected from the group consisting of Li, Na, K, Rb, Cs, Ca, Sr, and Ba.

In the method for producing a perpendicular magnetic recording medium described above, a ratio of total amount of substance of Si, Li, Na, K, Rb, Cs, Ca, Sr, and Ba in the perpendicular magnetic recording layer may be no less than 1 mol % and no more than 20 mol %.

In the method for producing a perpendicular magnetic recording medium described above, a ratio of total amount of substance of Li, Na, K, Rb, Cs, Ca, Sr, and Ba contained at the grain boundaries in the perpendicular magnetic recording layer may be no less than 1 mol % and no more than 30 mol %.

In the method for producing a perpendicular magnetic recording medium described above, the magnetic crystal particles may contain Co as the main component, and further contains Pt and Cr.

In the method for producing perpendicular magnetic recording described above, at least one of the at least one underlayer may contain at least one element selected from the group consisting of Ru, Ti, Rh, Pt, Pd, and Ir as a main component.

In the method for producing perpendicular magnetic recording described above, at least one of the at least one underlayer may be made of non-magnetic crystal particles containing at least one element selected from the group consisting of Ru, Ti, Rh, Pt, Pd, and Ir as a main component, and grain boundaries surrounding the non-magnetic crystal particles, and the grain boundaries may contain an oxide of at least one element selected from the group consisting of Si, Cr, and Ti.

In the method for producing a perpendicular magnetic recording medium described above, a ratio of the oxide of at least one element selected from the group consisting of Si, Cr, and Ti may be no less than 1 mol % and no more than 20 mol %.

In the method for producing a perpendicular magnetic recording medium described above, the grain boundaries in the at least one underlayer may include an oxide of silicon and at least one element selected from the group consisting of Li, Na, K, Rb, Cs, Ca, Sr, and Ba.

In the method for producing a perpendicular magnetic recording medium described above, a ratio of total amount of substance of Li, Na, K, Rb, Cs, Ca, Sr, and Ba contained at least one of at the grain boundaries in the at least one underlayer may be no less than 1 mol % and no more than 30 mol %.

A third aspect of the present invention is directed to a magnetic read/write apparatus including the perpendicular magnetic recording medium described above and a read/write head.

In the magnetic read/write apparatus described above, the read/write head may be a single magnetic pole recording head.

The first aspect of the present invention provides a perpendicular magnetic recording medium including: a substrate; an underlayer formed above substrate; a perpendicular magnetic recording layer formed above the underlayer, an easy magnetization axis of the perpendicular magnetic recording layer being oriented perpendicular to the substrate, the perpendicular magnetic recording layer including magnetic crystal particles and grain boundaries surrounding the magnetic crystal particles, wherein the grain boundaries contain an oxide of silicon and at least one element selected from the group consisting of Li, Na, K, Rb, Cs, Ca, Sr, and Ba.

The second aspect of the present invention provides a method for producing a perpendicular magnetic recording medium including the steps of: providing a substrate above which an underlayer is formed; and forming a perpendicular magnetic recording layer above the underlayer by evaporating a material which contains an oxide of silicon and at least one element selected from the group consisting of Li, Na, K, Rb, Cs, Ca, Sr, and Ba, the perpendicular magnetic recording layer including magnetic crystal particles and grain boundaries surrounding the magnetic crystal particles.

A fourth aspect of the present invention provides a magnetic read/write apparatus including the perpendicular magnetic recording medium described above and a read/write head.

The perpendicular magnetic recording medium according to the present invention has a multilayered structure in which an underlayer and a perpendicular magnetic recording layer are formed above a substrate, and the easy magnetization axis of the perpendicular magnetic recording layer is oriented perpendicular to the substrate. The perpendicular magnetic recording layer contains magnetic crystal particles and grain boundaries surrounding the magnetic crystal particles. The grain boundaries include silicon oxide and may include at least one element selected from the group consisting of Li, Na, K, Rb, Cs, Ca, Sr, and Ba.

In the present invention, as an additive (material to be added) for breaking down the magnetic crystal particles into minute particles, a composite oxide in which at least two predetermined component elements are contained so that the melting point or the glass transition temperature of the composite oxide becomes lower than that of $SiO_x$ is used.

Such a composite oxide can lower bulk modulus or viscosity thereof at temperatures lower than the melting point or the glass transition temperature, compared with materials having a higher melting point or glass transition temperature than the composite oxide. Particularly, such a composite oxide can lower the activation energy of diffusion during volume diffusion, and can significantly increase the diffusion rate. Accordingly, if such a composite oxide is subjected to evaporation for forming grain boundaries simultaneously with a material of magnetic crystal particles, the composite oxide rapidly diffuses and is sufficiently precipitated at grain boundaries of the magnetic crystal particles without having residual oxide within the magnetic crystal particles. Thus, according to the present invention, by using the composite oxide containing the predetermined component elements described above as an additive (material to be added) to break down the magnetic crystal particles into minute particles, it is possible to form minute granular structures without a super-saturated solid solution with the magnetic crystal particles.

Preferable additives to the oxide of silicon include Li, Na, K, Rb, Cs, Ca, Sr and Ba. When added to silica glass, these elements can reduce the glass transition temperature of silica glass. More preferable elements are Li, Na, K, and Ca. These elements particularly have a strong effect of decreasing the glass transition temperature of $SiO_x$.

Preferably, the ratio of amount of substance of the additive in the perpendicular magnetic layer is between 1 mol % and 20 mol %. This is because the effect of remarkably improving the SNR of the read/write performances tends not to be observed if the amount is less than 1 mol %, whereas the reading output of the read/write performances tends to decrease if the amount exceeds 20 mol %.

The ratio of the total amount of substance of Li, Na, K, Rb, Cs, Ca, Sr, and Ba in the composite oxide is preferably between 1 mol % and 30 mol %. If the amount is less than 1 mol %, the effect of remarkably improving the SNR of the read/write performances tends not to be observed. If the amount exceeds 30 mol %, not all of the element can form a solid solution with $SiO_2$, and the residual element tends to bind to the magnetic particles, adversely affecting the magnetic properties of the perpendicular magnetic recording layer.

As a material of magnetic crystal particles, alloys which contain Co as the main component, and further contains Pt and Cr, are preferably used. These alloys are preferable since they have a high crystal anisotropy energy and a high resistance to thermal fluctuation. Elements, such as Ta, Cu, or B, may be added to the alloy systems described above, if necessary, in order to improve magnetic properties.

More preferable materials for magnetic crystal particles are alloys, such as CoCrPt, CoCrPtB, CoCrPtTa, CoCrPtNd, or CoCrPtCu.

In the present invention, the term "main component" refers to an element which has the greatest amount of substance.

The perpendicular magnetic recording layer may have a multilayered structure including two or more layers, if necessary. If the perpendicular magnetic recording layer has a multilayered structure, at least one layer should be the layer mentioned above.

For the underlayer of the perpendicular magnetic recording layer, Ru, Rh, Pt, Pd, Ti, or Ir, for example, may be used. These elements are preferable since they exhibit an excellent lattice matching with the above-described CoCrPt alloy and can improve the crystal orientation of the perpendicular magnetic recording layer.

The underlayer may be two or more layers stacked together, if necessary. Examples of the stacked structure of the underlayer may include, for example, NiTa/Ru, NiTa/Rh, NiTa/Pt, NiTa/Pd, NiTa/Ir, NiTa/Ti, NiNb/Ru, NiNb/Rh, NiNb/Pt, NiNb/Pd, NiNb/Ir, NiNb/Ti, NiTa/Pt/Ru, NiTa/Pt/Rh, NiTa/Pd/Ru, NiTa/Pd/Rh, NiNb/Pt/Ru, NiNb/Pt/Rh, NiNb/Pd/Ru, NiNb/Pd/Rh, or the like, which are stacked from the substrate to the top.

The read/write performances of the perpendicular magnetic recording medium can be further improved by adding an oxide to the above-described underlayer so that granular structures are formed. Preferable oxides to be added are an oxide of Si, Cr, or Ti. The read/write performances can be further improved if a composite oxide, i.e., an oxide in which at least one element selected from the group consisting of Li, Na, K, Rb, Cs, Ca, Sr, and Ba is added to an oxide of silicon.

The amount of the additive added to the oxide in underlayer is preferably between 1 mol % and 20 mol %. If the amount is less than 1 mol %, the effect of remarkably improving the SNR of the read/write performances tends not to be observed. If the amount exceeds 20 mol %, the orientation of the perpendicular magnetic recording layer deteriorates, and the SNR of the read/write performances tends to decrease.

Preferably, the ratio of a total amount of substance of Li, Na, K, Rb, Cs, Ca, Sr and Ba in the composite oxide is no less than 1 mol % and no more than 30 mol %. If the amount is less than 1 mol %, the effect of remarkably improving the SNR of the read/write performances tends not to be observed. If the amount exceeds 30 mol %, not all of the element can form a solid solution with $SiO_2$, and the residual element tends to bind to the magnetic particles, adversely affecting the orientation of the perpendicular magnetic recording layer.

The underlayer having granular structures may be made of two or more layers, and may not directly contact the perpendicular magnetic recording layer.

A soft magnetic layer may be provided between the underlayer and the substrate.

By providing the soft magnetic layer having a high magnetic permeability, a structure in which the perpendicular magnetic recording layer is formed on the soft magnetic layer, known as perpendicular double layer medium, is defined. In this perpendicular double layer medium, the soft magnetic layer allows magnetic fields from a magnetic recording head, for example a single pole magnetic head, to pass through horizontally and to return to the magnetic head. The soft magnetic layer may be responsible for applying a sharp and sufficient vertical magnetic field to the recording layer of the magnetic field so that the reading/writing efficiency is improved.

As materials of the soft magnetic layer, CoZrNb, FeSiAl, FeTaC, CoTaC, NiFe, Fe, FeCoB, FeCoN, or FeTaN may be used.

Furthermore, a bias-imparting layer, such as an in-plane hard magnetic film and an antiferromagnetic film, for example, may be provided between the soft magnetic layer and the substrate. Since the soft magnetic layer easily forms magnetic domains and spiked noise is generated from these magnetic domains, generation of a magnetic domain wall can be prevented by applying magnetic field to one direction of a radial direction of the bias-imparting layer so as to apply a bias magnetic field to the soft magnetic layer formed on the bias-imparting layer. The bias-imparting layer may have a stacked structure so that anisotropy is distributed in a small unit and the formation of magnetic domain is inhibited. As materials of the bias-imparting layer, CoCrPt, CoCrPtB, CoCrPtTa, CoCrPtTaNd, CoSm, CoPt, CoPtO, CoPtCrO, CoPt—$SiO_2$, CoCrPt—$SiO_2$, or CoCrPtO—$SiO_2$ may be used.

As a non-magnetic substrate, a glass substrate, an Al-based alloy substrate, or a Si single crystalline substrate having an oxide film on the surface thereof, ceramics or plastic may be used. Furthermore, a similar effect may be achieved if the above-mentioned non-magnetic substrate is plated with, for example, NiP alloy.

A protective layer may be provided on the magnetic recording layer. As materials of the protective layer, carbon, diamond-like carbon paper (DLC), $SiN_x$, $SiO_x$, or $CN_x$, for example, may be used.

For manufacturing the perpendicular magnetic recording medium of this invention, a single-target sputtering technique using a composite target, or a multiple-target simultaneous sputtering technique using targets of respective materials may be employed.

BEST MODE FOR CARRYING OUT THE INVENTION

A first embodiment of the present invention will be explained with reference to the drawings.

Figure 1:
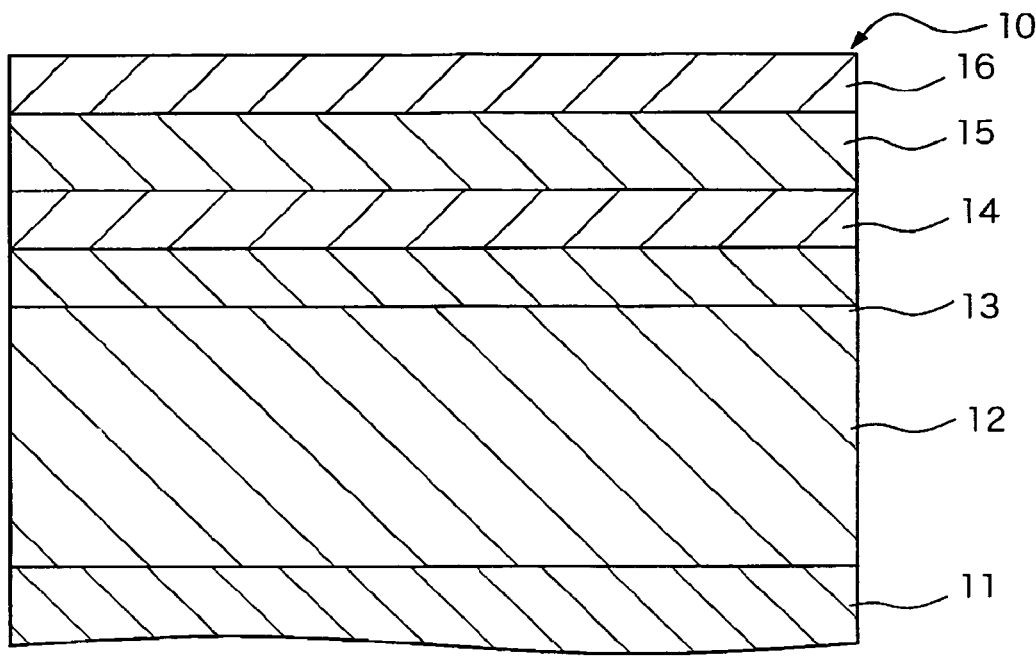
FIG. 1 is a cross-sectional view of a first embodiment of a perpendicular magnetic recording medium according to the present invention.

FIG. 1 is a cross-sectional view illustrating an example of a perpendicular magnetic recording medium according to this embodiment, and in this figure, reference numeral 10 denotes a perpendicular magnetic recording medium.

The perpendicular magnetic recording medium 10 of this embodiment includes a multilayered structure in which underlayers and a perpendicular magnetic recording layer in which easy magnetization axis of the perpendicular magnetic recording layer is oriented perpendicular to the substrate are stacked above the substrate. More specifically, as shown in FIG. 1, a soft magnetic layer 12, a second underlayer 13, a first underlayer 14, a perpendicular magnetic recording layer (perpendicular magnetic layer) 15, and a protective layer 16 are stacked on substrate 11, in this order.

In this embodiment, the perpendicular magnetic recording layer 15 includes magnetic crystal particles and grain boundaries surrounding the magnetic crystal particles, and these grain boundaries include an oxide of silicon and at least one element selected from the group consisting of Li, Na, K, Rb, Cs, Ca, Sr, and Ba.

The grain boundaries contain a composite oxide containing an element described above since the magnetic crystal particles are broken into minute particles, and the oxide has a lower melting point or glass transition temperature than $SiO_x$. By this, minute granular structures are formed without forming a supersaturated solid solution with the magnetic crystal particles.

Preferable additives to the oxide of silicon include Li, Na, K, Rb, Cs, Ca, Sr and Ba. It is known that these elements can reduce the glass transition temperature of silica glass when added into silica glass. More preferable additives are Li, Na, K, and Ca Because these elements particularly have a strong effect of decreasing the glass transition temperature of $SiO_x$, they can significantly improve the read/write performances of the perpendicular magnetic recording medium.

Preferably, the ratio of amount of substance of the additive in the perpendicular magnetic layer 15 is between 1 mol % and 20 mol %. This is because the effect of remarkably improving the SNR of the read/write performances tends not to be observed if the amount is less than 1 mol %, whereas the reading output of the read/write performances tends to decrease if the amount exceeds 20 mol %.

The ratio of the total amount of substance of Li, Na, K, Rb, Cs, Ca, Sr, and Ba within the composite oxide in the perpendicular magnetic layer 15 is preferably between 1 mol % and 30 mol %. If the amount is less than 1 mol %, the effect of remarkably improving the SNR of the read/write performances tends not to be observed. If the amount exceeds 30 mol %, not all of the element can form a solid solution with $SiO_2$, and the residual element tends to bind to the magnetic particles, negatively affecting the magnetic properties Preferable materials of magnetic crystal particles in the perpendicular magnetic layer 15 are alloys containing Co as a main component, and Pt and Cr. More preferably, CoCrPt, CoCrPtB, CoCrPtTa, CoCrPtNd, or CoCrPtCu, and the like are used. These alloys have a high crystal anisotropy energy and a high resistance to thermal fluctuation. In addition, addition of additive elements, such as Ta, Cu, or B, may improve the magnetic properties of the alloy systems.

The perpendicular magnetic recording layer 15 may have a multilayered structure including two or more layers, if necessary. If the perpendicular magnetic recording layer 15 has a multilayer structure, at least one layer should be the layer mentioned above.

As materials of the underlayers 13 and/or 14 having the granular structure, Ru, Rh, Pt, Pd, Ti, or Ir may be used, for example. These elements are preferable since they exhibit an excellent lattice matching with the above-described CoCrPt alloy and can improve the crystal orientation of the perpendicular magnetic recording layer 15.

Examples of the stacked structure of the underlayers 13 and 14 include, for example, NiTa/Ru, NiTa/Rh, NiTa/Pt, NiTa/Pd, NiTa/Ti, NiNb/Ru, NiNb/Rh, NiNb/Pt, NiNb/Pd, NiNb/Ir, NiNb/Ti, or the like, which are stacked from the substrate to the top.

Furthermore, the underlayer 14 may not be provided directly contacting the perpendicular magnetic recording layer 15.

The read/write performances of the perpendicular magnetic recording medium can be further improved by adding an oxide to the underlayers 13 and/or 14 so that granular structures are formed. Referable oxides to be added are an oxide of Si, Cr, or Ti. The read/write performances can be further improved if a composite oxide, i.e., an oxide in which at least one element selected from the group consisting of Li, Na, K, Rb, Cs, Ca, Sr, and Ba is added to an oxide of silicon.

The amount of the additive added to the underlayers 13 and/or 14 is preferably between 1 mol % and 20 mol %. If the amount is less than 1 mol %, the effect of remarkably improving the SNR of the read/write performances tends not to be observed. If the amount exceeds 20 mol %, the orientation of the perpendicular magnetic recording layer 15 deteriorates, and the SNR of the read/write performances tends to decrease.

Preferably, the ratio of a total amount of substance of Li, Na, K, Rb, Cs, Ca, Sr and Ba in the composite oxide in the underlayers 13 and/or 14 is no less than 1 mol % and no more than 30 mol %. If the amount is less than 1 mol %, the effect of remarkably improving the SNR of the read/write performances tends not to be observed. If the amount exceeds 30 mol %, not all of the element can form a solid solution with $SiO_2$, and the residual element tends to bind to the magnetic particles, adversely affecting the orientation of the perpendicular magnetic recording layer 15.

The soft magnetic layer 12 has a high magnetic permeability, and is provided between the underlayer 13 and the substrate 11, which forms a so-called "perpendicular double layer medium" in which the perpendicular magnetic recording layer 15 is provided above the soft magnetic layer 12. In this perpendicular double layer medium, the soft magnetic layer 12 allows magnetic fields from a magnetic recording head, for example a single pole magnetic head, to pass through horizontally and to return to the magnetic head. The soft magnetic layer 12 may be responsible for applying a sharp and sufficient vertical magnetic field to the recording layer (the perpendicular magnetic layer 15) of the magnetic field so that the reading/writing efficiency is improved.

As materials of the soft magnetic layer 12, CoZrNb, FeSiAl, FeTaC, CoTaC, NiFe, Fe, FeCoB, FeCoN, or FeTaN may be used.

Furthermore, a bias-imparting layer, such as an in-plane hard magnetic film and an antiferromagnetic film, for example, may be provided between the soft magnetic layer 12 and the substrate 11. Since the soft magnetic layer 12 easily forms magnetic domains and spiked noise is generated from these magnetic domains, generation of a magnetic domain wall can be prevented by applying magnetic field to one direction of a radial direction of the bias-imparting layer so as to apply a bias magnetic field to the soft magnetic layer 12 formed on the bias-imparting layer. The bias-imparting layer may have a stacked structure so that anisotropy is distributed in a small unit and the formation of magnetic domain is inhibited. As materials of the bias-imparting layer, CoCrPt, CoCrPtB, CoCrPtTa, CoCrPtTaNd, CoSm, CoPt, CoPtO, CoPtCrO, CoPt—$SiO_2$, CoCrPt—$SiO_2$, or CoCrPtO—$SiO_2$ may be used.

As the non-magnetic substrate 11, a glass substrate, an Al-based alloy substrate, or a Si single crystalline substrate having an oxide film on the surface thereof, ceramics or plastic may be used. Furthermore, a similar effect may be achieved if the above-mentioned non-magnetic substrate is plated with, for example, NiP alloy.

The protective layer 16 is provided on the perpendicular magnetic recording layer 15, and as materials of the protective layer 16, carbon, diamond-like carbon paper (DLC), $SiN_x$, $SiO_x$, or $CN_x$, for example, may be used.

In manufacturing the perpendicular magnetic recording medium 10 of this embodiment, vacuum deposition, such as sputtering, may be used for stacking each of the layers. Among various sputtering techniques, in particular, a single-target sputtering technique using a composite target, or a multiple-target simultaneous sputtering technique using targets of respective materials may be employed.

Since the perpendicular magnetic recording medium 10 has the structure described above, a perpendicular magnetic recording medium in which the read/write performances of the perpendicular magnetic recording medium is improved, the diameter of magnetic crystal particles are reduced, and an excellent SNR performance is achieved without having deteriorated crystallinity and orientation of magnetic crystal particles, and a magnetic read/write apparatus using the same can be provided.

In particular, the perpendicular magnetic layer 15 has a high crystal anisotropy energy and a high resistance to thermal fluctuation; thus the magnetic properties can be improved.

Japanese Laid-Open Patent Application No. H09-204651 described above discloses adding an oxide of at least one alkaline earth metal to a magnetic thin film, and optionally having SiO in the alkaline earth metal oxide. However, unlike the present invention, JP 09-204651 does not teach composition ratio of SiO to the alkaline earth metal oxide, or composition of the oxide in the magnetic film; thus the effect of remarkably improving the SNR cannot be achieved only with the teachings of JP H09-204651.

A second embodiment of a perpendicular magnetic recording medium according to the present invention will be explained with reference to the drawings.

Figure 2:
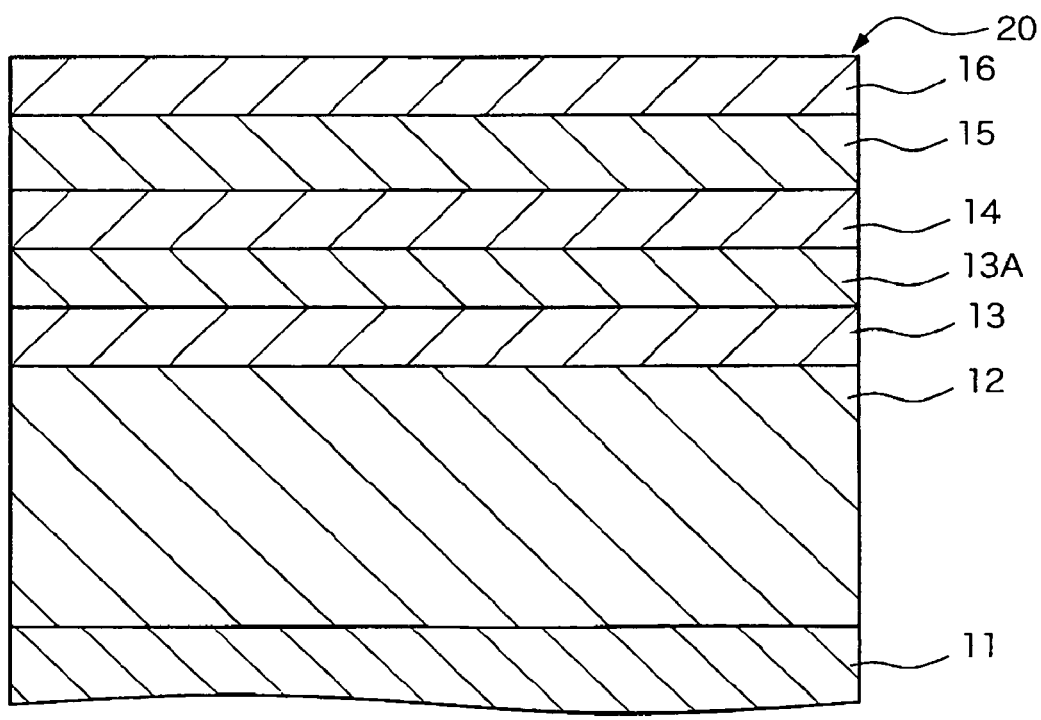
FIG. 2 is a cross-sectional view of a second embodiment of the perpendicular magnetic recording medium according to the present invention.

FIG. 2 is a cross-sectional view illustrating an example of the perpendicular magnetic recording medium 20 of this embodiment.

This embodiment is similar to the above-described first embodiment, except that the underlayer is made of three layers, as shown in FIG. 2. Like reference numerals indicate corresponding elements, and the description of similar elements will be omitted.

In this embodiment, the underlayers 13, 13A and 14 are made from three layers stacked together having granular structures. Example of the stacked structure of the underlayers 13, 13A and 14 may include NiTa/Pt/Ru, NiTa/Pt/Rh, NiTa/Pd/Ru, NiTa/Pd/Rh, NiNb/Pt/Ru, NiNb/Pt/Rh, NiNb/Pd/Ru, NiNb/Pd/Rh or the like, which are stacked from the substrate to the top.

Furthermore, the underlayer 14 may not be provided directly contacting the perpendicular magnetic recording layer 15.

In addition to the same advantageous effects as the perpendicular magnetic recording medium of the first embodiment, the perpendicular magnetic recording medium 20 in this embodiment exhibits a better SNR since the underlayer is made of three layers.

Figure 3:
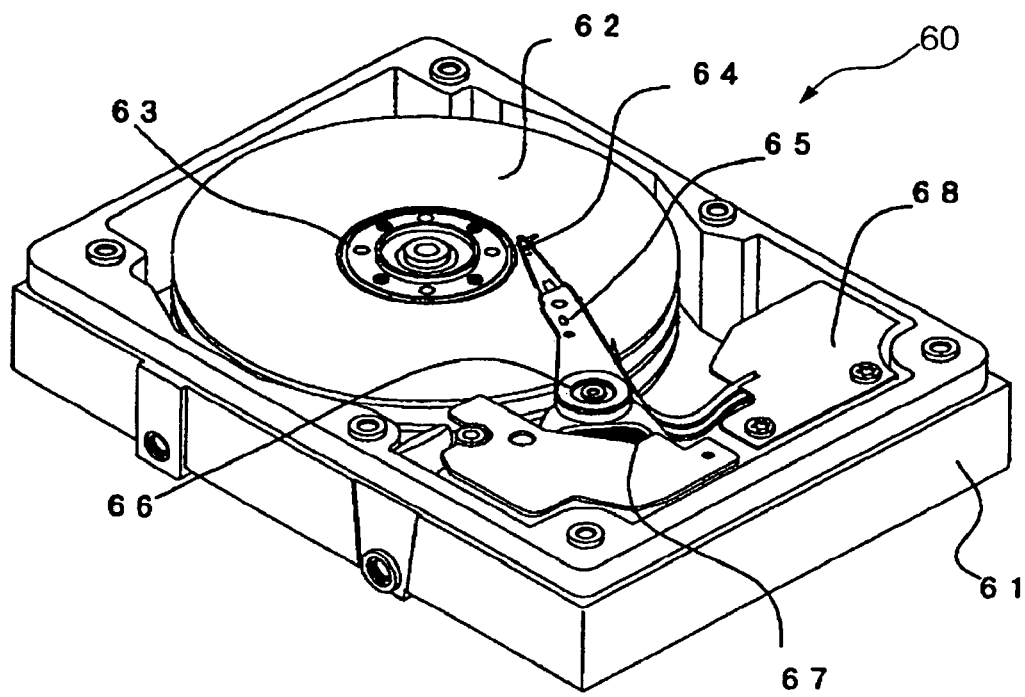
FIG. 3 is a partially exploded view of one example of a magnetic recording apparatus according to the present invention.

FIG. 3 is a partially exploded view of one example of a magnetic recording apparatus according to the present invention.

As shown in FIG. 3, a perpendicular magnetic recording apparatus of the present invention includes a box-shaped housing 61 with top thereof open, and a top cover (not shown) which is fixed to the housing with a plurality of screws so that the top opening of the housing is closed.

Within the housing 61, are disposed a magnetic storage medium 62 employing the perpendicular magnetic recording medium 10 described above, a spindle motor 63 as driving means to support and rotate the magnetic storage medium 62, a magnetic head 64 which writes or reads magnetic signals on the magnetic storage medium 62, a head actuator 65 which has a suspension having the magnetic head 64 at one end and movably supports the magnetic head 64 with respect to the magnetic storage medium 62, a rotary shaft 66 which rotatably supports the head actuator 65, a voice coil motor 67 which rotates and positions the actuator 65 via the rotary shaft 66, and a head amplifier circuit 68.

As shown in this example, the perpendicular magnetic recording medium 10 according to various embodiments of the present invention may be used in the magnetic storage medium 62 of the perpendicular magnetic recording apparatus 60.

As described above, according to the perpendicular magnetic read/write apparatus of this embodiment, a magnetic read/write apparatus which enables high density recording can be obtained by using the perpendicular magnetic recording medium 10 which has magnetic crystal particles with smaller diameter and exhibits an excellent SNR performance without having the deteriorated crystallinity and orientation of the magnetic crystal particles.

Next, the present invention will be described in greater detail using examples.

EXAMPLE 1

For Example 1, a perpendicular magnetic recording medium having a structure shown in FIG. 1 was fabricated. First, a non-magnetic glass substrate which has a diameter of 2.5 inches in the shape of a hard disk was provided.

After evacuating a chamber for sputtering equipment from atmospheric pressure to a pressure of $2 \times 10^{-5}$ Pa or lower, a $Co_{84}Zr_6Nb_{10}$ soft magnetic layer having a thickness of 200 nm was deposited as a soft magnetic layer using a $Co_{84}Zr_6Nb_{10}$ target, and then a Ta layer having a thickness of 8 nm was deposited as a second underlayer using a Ta target under an argon atmosphere of 0.67 Pa. Then, a Ru layer was deposited to a thickness of 15 nm as a first underlayer using a Ru target under an argon atmosphere of 3 Pa.

Next, a magnetic recording layer having a thickness of 15 nm was formed using a composite target (Co-10 at % Cr-14 at % Pt, $SiO_2$, and $Li_2O$) as a material of magnetic crystal particle material. Carbon was deposited to a thickness of 7 μm as a protective layer under an argon atmosphere of 0.67 Pa. After forming the layers, perfluoro polyether (PFPE) lubricant was applied to a thickness of 1.3 nm (13 Å) by a dip method on the surface of the protective layer to obtain each magnetic storage medium. The input power to each of the targets was 1000 W. In the magnetic recording layer, the mole ratio of (CoCrPt alloy):(oxide of $SiO_2+Li_2O$) was set to $(1-x):x$, and the mole ratio of $SiO_2:Li_2O$ in the oxide was set to $(1-y):y$, and "x" and "y" were varied in ranges of from 0 to 0.3, and from 0 to 0.4, respectively.

Furthermore, various kinds of magnetic storage media were made using $Na_2O$, $K_2O$, $Rb_2O$, $Cs_2O$, CaO, SrO, or BaO instead of $Li_2O$.

The read/write performances of each magnetic storage media were evaluated using a spin stand. As a magnetic head, a combination of a single pole magnetic head having a write track width of 0.2 μm and an MR head having a read track width of 0.3 μm was used.

Measurements were carried out when a disk was rotated at 4200 rpm at a constant position of 20 mm of radius.

As SNR of medium, the output of signal noise ratio after processed in the differentiating circuit (SNRm, S stands for an output at a track recording density of 119 kfci, and Nm stands for a rms (root mean square) at 716 kfci) was evaluated, and as an indicator of recording resolution, a full width at half maximum of differentiation waveform (dPW50) was measured.

Values of SNRm and dPW50 of each recording medium having additives when $x=0.08$ and $y=0.05$ are listed in the following Table 1.

TABLE 1

| Additive | SNRm (dB) | dPW50 (nm) |
|---|---|---|
| $SiO_2$ | 18.0 | 104 |
| $SiO_2 + Li_2O$ | 20.1 | 74 |
| $SiO_2 + Na_2O$ | 20.0 | 76 |
| $SiO_2 + K_2O$ | 20.2 | 72 |
| $SiO_2 + Rb_2O$ | 19.5 | 84 |
| $SiO_2 + Cs_2O$ | 19.3 | 80 |
| $SiO_2 + CaO$ | 19.9 | 77 |
| $SiO_2 + SrO$ | 19.7 | 78 |
| $SiO_2 + BaO$ | 19.4 | 79 |

As shown in Table 1, from the comparison of The SNRm values and dPW50, favorable SNRm was obtained when $Li_2O$, $Na_2O$, $K_2O$, $Rb_2O$, $Cs_2O$, CaO, SrO, or BaO was added in addition to $SiO_2$ compared to only when $SiO_2$ was added.

Figure 4:
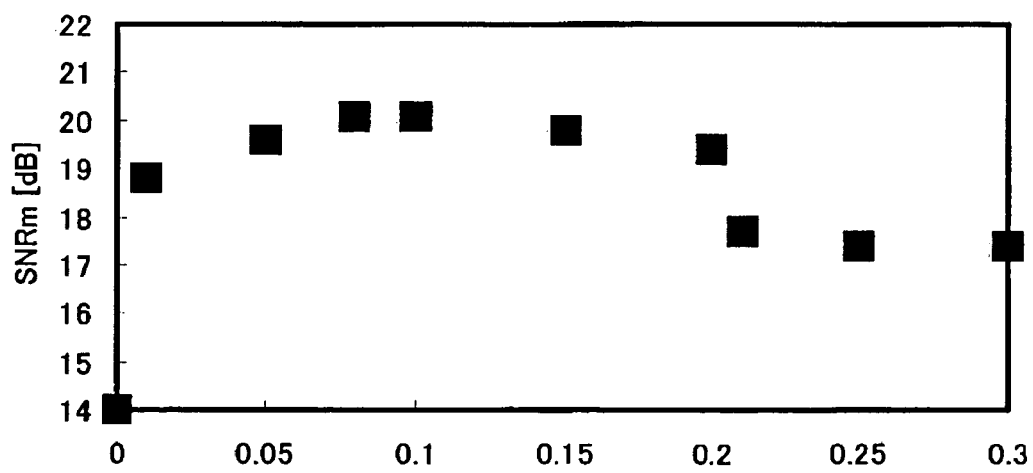
FIG. 4 is a graph which shows the relationship between the amount of additive and SNRm values of Example 1.

In FIG. 4, a graph illustrating the relationship between the amount of additive "x" and SNRm values when $SiO_2+Li_2O$ ($y=0.05$) was used is shown. This graph indicates that the amount of additive from 1 mol % to 20 mol % is preferable since SNRm was improved. A similar trend was observed when $Na_2O$, $K_2O$, $Rb_2O$, $Cs_2O$, CaO, SrO, or BaO was added instead of $Li_2O$.

Figure 5:
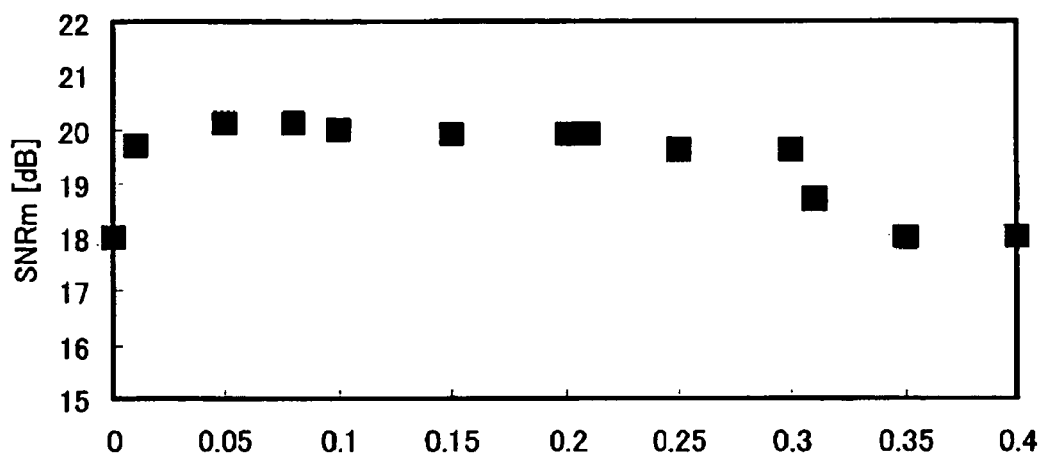
FIG. 5 is a graph which shows the relationship between the amount of $Li_2O$ in the additive and SNRm values of Example 1.

The relationship between the ratio "y" of $SiO_2:Li_2O$ and SNRm values are shown in FIG. 5 when the amount of additive $x=0.08$. This graph indicates "y" of from 0.01 to 0.3 is preferable since SNRm was improved. A similar trend was observed when $Na_2O$, $K_2O$, $Rb_2O$, $Cs_2O$, CaO, SrO, or BaO was added instead of $Li_2O$.

Then, the microstructure in the recording layer when the amount of additive $SiO_2+Li_2O$ of $x=0.08$ and $y=0.05$ was observed using a transmission electron microscope (TEM) with an accelerating voltage of 400 kV. Magnetic crystal particles and crystal grain boundaries were clearly observed under TEM, indicating the granular structure in which magnetic crystal particles are surrounded by grain boundaries. Furthermore, elemental analysis of grain boundaries using energy dispersive X-ray analysis (EDX) confirmed the presence of Si and Li at the crystal grain boundaries.

Next, magnetic storage media with $SiO_2+Li_2O$ having the structures listed in the following Table 2 were made and were evaluated in a manner similar to the above example, except that the second underlayer was substituted with Ta, Ni-40 at % Ta or Ni-30 at % Nb, and the first underlayer was substituted with Ru, Rh, Pt, Pd, Ir or Ti, respectively.

SNRm values with the amount of additives of $x=0.08$ and $y=0.05$ are listed in Table 2 below.

TABLE 2

| Second Underlayer | First Underlayer | SNRm (dB) |
|---|---|---|
| Ta | Ru | 20.1 |
| Ta | Rh | 19.8 |
| Ta | Pt | 19.6 |
| Ta | Pd | 19.8 |
| Ta | Ir | 19.5 |
| Ta | Ti | 19.4 |
| NiTa | Ru | 20.4 |
| NiTa | Rh | 20.2 |
| NiTa | Pt | 19.9 |
| NiTa | Pd | 19.9 |
| NiTa | Ir | 19.4 |
| NiTa | Ti | 19.4 |
| NiNb | Ru | 20.3 |

TABLE 2-continued

| Second Underlayer | First Underlayer | SNRm (dB) |
|---|---|---|
| NiNb | Rh | 20.0 |
| NiNb | Pt | 20.0 |
| NiNb | Pd | 19.6 |
| NiNb | Ir | 19.3 |
| NiNb | Ti | 19.4 |

Table 2 indicates that each of the underlayers is preferable since they provided excellent SNRm values. A similar trend was observed when each of $Na_2O$, $K_2O$, $Rb_2O$, $Cs_2O$, CaO, SrO, or BaO was added instead of $Li_2O$.

Next, magnetic storage media having the structures listed in the following Table 3 were made and evaluated in a manner similar to the above examples, except that a third underlayer was provided between the second underlayer and the soft magnetic layer, as the perpendicular magnetic recording medium 20 in FIG. 2.

SNRm values with the amount of additives of x=0.08 and y=0.05 are listed in Table 3 below.

TABLE 3

| Third Underlayer | Second Underlayer | First Underlayer | SNRm (dB) |
|---|---|---|---|
| Ta | Pt | Ru | 20.5 |
| Ta | Pd | Ru | 20.4 |
| Ta | Ir | Ru | 20.0 |
| Ta | Ti | Ru | 19.7 |
| Ta | Pt | Rh | 20.4 |
| Ta | Pd | Rh | 20.5 |
| Ta | Ir | Rh | 20.1 |
| Ta | Ti | Rh | 19.7 |
| NiTa | Pt | Ru | 20.6 |
| NiTa | Pd | Ru | 20.6 |
| NiTa | Ir | Ru | 19.8 |
| NiTa | Ti | Ru | 19.6 |
| NiTa | Pt | Rh | 20.2 |
| NiTa | Pd | Rh | 20.1 |
| NiTa | Ir | Rh | 19.5 |
| NiTa | Ti | Rh | 19.4 |
| NiNb | Pt | Ru | 20.5 |
| NiNb | Pd | Ru | 20.6 |
| NiNb | Ir | Ru | 19.7 |
| NiNb | Ti | Ru | 19.7 |
| NiNb | Pt | Rh | 19.9 |
| NiNb | Pd | Rh | 20.2 |
| NiNb | Ir | Rh | 19.7 |
| NiNb | Ti | Rh | 19.8 |

Table 3 indicates that each of the underlayers is preferable since they provided excellent SNRm values. A similar trend was observed when $Na_2O$, $K_2O$, $Rb_2O$, $Cs_2O$, CaO, SrO, or BaO was added instead of $Li_2O$.

EXAMPLE 2

For Example 2, a non-magnetic glass substrate in the shape of a 2.5-inch hard disk was provided.

After evacuating a chamber for sputtering equipment from atmospheric pressure to a pressure of $2 \times 10^{-5}$ Pa or lower, a $Co_{84}Zr_6Nb_{10}$ soft magnetic layer having a thickness of 200 nm was deposited as a soft magnetic layer using a $Co_{84}Zr_6Nb_{10}$ target, and then a Ta layer having a thickness of 8 nm was deposited as a second underlayer using a Ta target under an argon atmosphere of 0.67 Pa. Then, a Ru layer was deposited to a thickness of 15 nm as a first underlayer using a Ru target under an argon atmosphere of 3 Pa.

Next, a magnetic recording layer having a thickness of 15 nm was formed using a composite target (Co-10 at % Cr-14 at % Pt, $SiO_2$, and $Li_2O$) as a material of magnetic crystal particle material. Carbon was deposited to a thickness of 7 nm as a protective layer under an argon atmosphere of 0.67 Pa. After forming the layers, perfluoro polyether (PFPE) lubricant was applied to a thickness of 1.3 nm (13 Å) by a dip method on the surface of the protective layer to obtain each magnetic storage medium. The input power to each of the targets was 1000 W. In the first underlayer, the mole ratio of Ru:$SiO_2$ was set to (1−a):a, and "a" was varied in a range of from 0 to 0.3. The composition of a magnetic recording layer was varied in the same manner as Example 1.

Furthermore, various perpendicular magnetic recording media were made by using $Na_2O$, $K_2O$, $Rb_2O$, $Cs_2O$, CaO, SrO, or BaO instead of $Li_2O$ in the magnetic recording layer, and using $Cr_2O_3$, TiO2, or TiO instead of $SiO_2$ in the first underlayer.

The read/write performances of the resultant media were evaluated by the same method as Example 1. Values of SNRm and dPW50 are listed in the following Table 4 with x=0.08, y=0.05, and a=0.05.

TABLE 4

| First Underlayer | SNRm (dB) | dPW50 (nm) |
|---|---|---|
| Ru | 20.1 | 74 |
| Ru—$SiO_2$ | 20.7 | 72 |
| Ru—$Cr_2O_3$ | 20.6 | 72 |
| Ru—TiO2 | 20.5 | 73 |
| Ru—TiO | 20.8 | 70 |

Favorable SNRm was obtained when $SiO_2$, $Cr_2O_3$, $TiO_2$, or TiO was added, compared when the first underlayer was only made of Ru.

Figure 6:
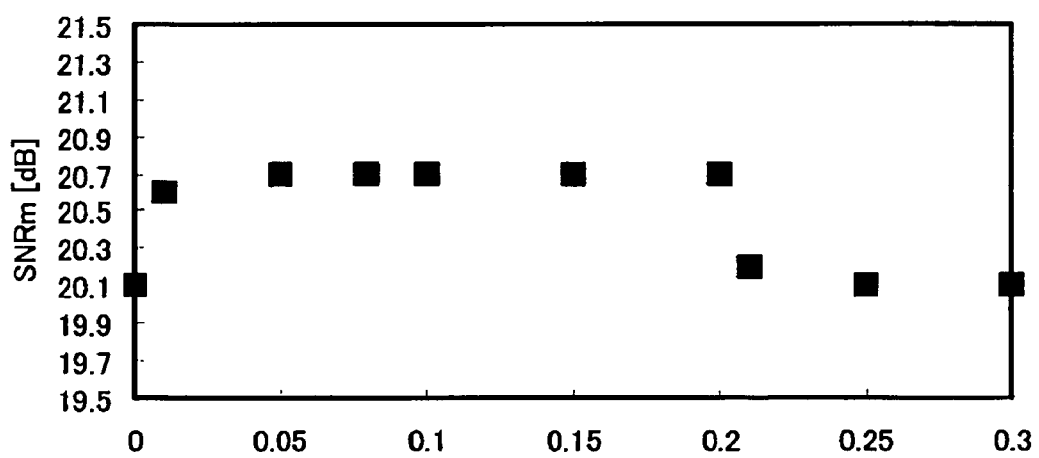
FIG. 6 is a graph which shows the relationship between the amount of additive and SNRm values of Example 2.

The relationship between the amount of additive "a" and SNRm values are shown in FIG. 6 when $SiO_2$ was added to the first underlayer. This graph indicates "a" of from 0.01 to 0.2 is preferable since SNRm was improved. A similar trend was observed when $Cr_2O_3$, TiO2, or TiO was added.

Next, magnetic storage media having the structures listed in the following Table 5 were made and evaluated when $SiO_2$ was added to the first underlayer in a manner similar to the above examples, except that the second underlayer was substituted with Ta, Ni-40 at % Ta or Ni-30 at % Nb, and Ru of the first underlayer was substituted with Rh, Pt, Pd, Ir or Ti. The SNRm values when the amount of additive a=0.05 are listed in Table 5.

TABLE 5

| Second Underlayer | First Underlayer | SNRm (dB) |
|---|---|---|
| Ta | Ru—$SiO_2$ | 20.7 |
| Ta | Rh—$SiO_2$ | 20.6 |
| Ta | Pt—$SiO_2$ | 20.5 |
| Ta | Pd—$SiO_2$ | 20.6 |
| Ta | Ir—$SiO_2$ | 20.4 |
| Ta | Ti—$SiO_2$ | 20.3 |
| NiTa | Ru—$SiO_2$ | 20.8 |
| NiTa | Rh—$SiO_2$ | 20.6 |
| NiTa | Pt—$SiO_2$ | 20.6 |
| NiTa | Pd—$SiO_2$ | 20.7 |
| NiTa | Ir—$SiO_2$ | 20.4 |
| NiTa | Ti—$SiO_2$ | 20.2 |
| NiNb | Ru—$SiO_2$ | 20.8 |
| NiNb | Rh—$SiO_2$ | 20.8 |
| NiNb | Pt—$SiO_2$ | 20.4 |
| NiNb | Pd—$SiO_2$ | 20.4 |
| NiNb | Ir—$SiO_2$ | 20.1 |
| NiNb | Ti—$SiO_2$ | 20.2 |

This table indicates that each of the underlayers is preferable since they provide excellent SNRm values.

A similar trend was observed when $Cr_2O_3$, TiO2, or TiO was used as an additive to the first underlayer.

Next, magnetic storage media having the structures listed in the following Table 6 were made and were evaluated in a manner similar to the above example, except that a third underlayer was provided between the second underlayer and the soft magnetic layer The SNRm values when the amount of additive a=0.05 are listed in Table 6.

TABLE 6

| Third Underlayer | Second Underlayer | First Underlayer | SNRm (dB) |
|---|---|---|---|
| Ta | Pt | Ru—$SiO_2$ | 20.9 |
| Ta | Pd | Ru—$SiO_2$ | 20.7 |
| Ta | Ir | Ru—$SiO_2$ | 20.4 |
| Ta | Ti | Ru—$SiO_2$ | 20.5 |
| Ta | Pt | Rh—$SiO_2$ | 20.7 |
| Ta | Pd | Rh—$SiO_2$ | 20.7 |
| Ta | Ir | Rh—$SiO_2$ | 20.4 |
| Ta | Ti | Rh—$SiO_2$ | 20.3 |
| NiTa | Pt | Ru—$SiO_2$ | 21.1 |
| NiTa | Pd | Ru—$SiO_2$ | 21.0 |
| NiTa | Ir | Ru—$SiO_2$ | 20.5 |
| NiTa | Ti | Ru—$SiO_2$ | 20.6 |
| NiTa | Pt | Rh—$SiO_2$ | 20.4 |
| NiTa | Pd | Rh—$SiO_2$ | 20.8 |
| NiTa | Ir | Rh—$SiO_2$ | 20.7 |
| NiTa | Ti | Rh—$SiO_2$ | 20.4 |
| NiNb | Pt | Ru—$SiO_2$ | 21.1 |
| NiNb | Pd | Ru—$SiO_2$ | 21.0 |
| NiNb | Ir | Ru—$SiO_2$ | 20.6 |
| NiNb | Ti | Ru—$SiO_2$ | 20.7 |
| NiNb | Pt | Rh—$SiO_2$ | 20.9 |
| NiNb | Pd | Rh—$SiO_2$ | 20.7 |
| NiNb | Ir | Rh—$SiO_2$ | 20.3 |
| NiNb | Ti | Rh—$SiO_2$ | 20.4 |

This table indicates that each of the underlayers is preferable since they provide excellent SNRm values.

A similar trend was observed when $Cr_2O_3$, TiO2, or TiO was used as an additive to the first underlayer.

Furthermore, the effect of improving SNRm by the additive to the first underlayer described above was similarly observed when $Na_2O$, $K_2O$, $Rb_2O$, $Cs_2O$, CaO, SrO or BaO was used in the magnetic recording layer instead of $Li_2O$.

EXAMPLE 3

For Example 3, a non-magnetic glass substrate in the shape of a 2.5-inch hard disk was provided.

After evacuating a chamber for sputtering equipment from atmospheric pressure to a pressure of $2 \times 10^{-5}$ Pa or lower, a $Co_{84}Zr_6Nb_{10}$ soft magnetic layer having a thickness of 200 nm was deposited as a soft magnetic layer using a $Co_{84}Zr_6Nb_{10}$ target, and then a Ta layer having a thickness of 8 nm was deposited as a second underlayer using a Ta target under an argon atmosphere of 0.67 Pa. Then, a Ru—$SiO_2$—$Li_2O$ layer was deposited to a thickness of 15 nm as a first underlayer using a composite target including Ru, $SiO_2$, and $Li_2O$ under an argon atmosphere of 3 Pa.

Next, a magnetic recording layer having a thickness of 15 nm was formed using a composite target which contains Co-10 at % Cr-14 at % Pt, $SiO_2$, and $Li_2O$ as magnetic crystal particle materials. Carbon was deposited to a thickness of 7 nm as a protective layer under an argon atmosphere of 0.67 Pa. After forming the layers, perfluoro polyether (PFPE) lubricant was applied to a thickness of 1.3 nm (13 Å) by a dip method on the surface of the protective layer to obtain each magnetic storage medium. The input power to each of the targets was 1000 W. In the magnetic recording layer, the mole ratio of Ru:(oxide $SiO_2$+$Li_2O$) was set to (1−a):a, and the mole ratio of $SiO_2$:$Li_2O$ in the oxide was set to (1−b):b, and "a" and "b" were varied in ranges of from 0 to 0.3, and from 0 to 0.4, respectively. The composition of a magnetic recording layer changed same as Example 1.

Furthermore, various perpendicular magnetic recording media were obtained by adding $Na_2O$, $K_2O$, $Rb_2O$, $Cs_2O$, CaO, SrO, or BaO instead of $Li_2O$ in the magnetic recording layer, and using $Na_2O$, $K_2O$, $Rb_2O$, $Cs_2O$, CaO, SrO or BaO instead of $Li_2O$ in the first underlayer.

The read/write performances of the resultant media were evaluated by the same method as Example 1. Values of SNRm and dPW50 are listed in the following Table 7 with x=0.08, y=0.05, a=0.05, and b=0.05.

TABLE 7

| Additive | SNRm (dB) | dPW50 (nm) |
|---|---|---|
| $SiO_2$ | 20.7 | 72 |
| $SiO_2$ + $Li_2O$ | 21.6 | 67 |
| $SiO_2$ + $Na_2O$ | 21.4 | 68 |
| $SiO_2$ + $K_2O$ | 21.7 | 67 |
| $SiO_2$ + $Rb_2O$ | 21.1 | 69 |
| $SiO_2$ + $Cs_2O$ | 21.0 | 68 |
| $SiO_2$ + CaO | 21.5 | 67 |
| $SiO_2$ + SrO | 21.2 | 70 |
| $SiO_2$ + BaO | 21.0 | 70 |

This table indicates that adding of $Li_2O$, $Na_2O$, $K_2O$, $Rb_2O$, $Cs_2O$, CaO, SrO, or BaO in addition to $SiO_2$ is preferable since it improves SNRm, compared to when the first underlayer includes only Ru—$SiO_2$.

Figure 7:
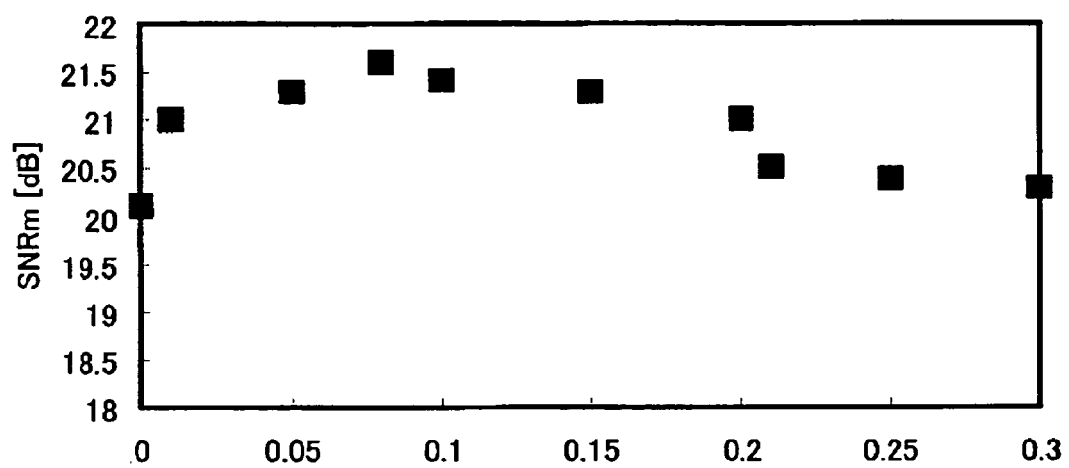
FIG. 7 is a graph which shows the relationship between the amount of additive and SNRm values of Example 3.

The relationship between the amount of additive "a" and SNRm values are shown in FIG. 7 when $SiO_2$+$Li_2O$ (b=0.05) were added to the first underlayer. This graph indicates that the amount of additive "a" of from 0.01 to 0.2 is preferable since SNRm was improved. A similar trend was observed when $Na_2O$, $K_2O$, $Rb_2O$, $Cs_2O$, CaO, SrO, or BaO was added instead of $Li_2O$.

Figure 8:
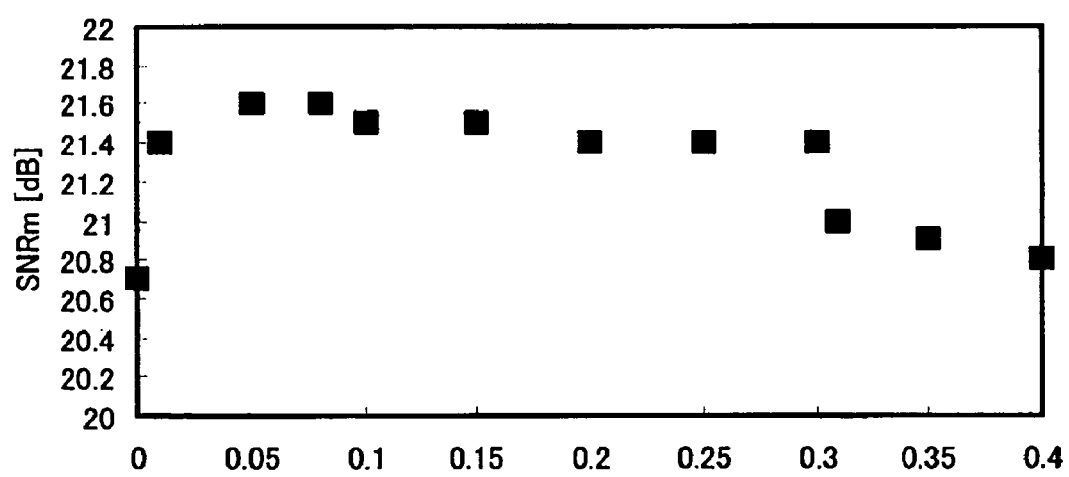
FIG. 8 is a graph which shows the relationship between the amount of $Li_2O$ in the additive and SNRm values of Example 3.

The relationship between the mole ratio "b" in the oxide and SNRm values are shown in FIG. 8 when $SiO_2$+$Li_2O$ (a=0.05) was added to the first underlayer. This graph indicates that the mole ratio "b" in the oxide of from 0.01 to 0.3 is preferable since SNRm was improved. A similar trend was observed when $Na_2O$, $K_2O$, $Rb_2O$, $Cs_2O$, CaO, SrO, or BaO was added instead of $Li_2O$.

Next, magnetic storage media having the structures listed in the following Table 8 were made and evaluated when $SiO_2$+$Li_2O$ was added to the first underlayer in a manner similar to the above examples, except that the second underlayer was substituted with Ta, Ni-40 at % Ta or Ni-30 at % Nb, and Ru in the first underlayer was substituted with Rh, Pt, Pd, Ir or Ti. The SNRm values when the amount of additive a=0.05 and b=0.05 are listed in Table 8.

TABLE 8

| Second Underlayer | First Underlayer | SNRm (dB) |
|---|---|---|
| Ta | Ru—$SiO_2$—$Li_2O$ | 21.6 |
| Ta | Rh—$SiO_2$—$Li_2O$ | 21.4 |
| Ta | Pt—$SiO_2$—$Li_2O$ | 21.0 |
| Ta | Pd—$SiO_2$—$Li_2O$ | 21.0 |
| Ta | Ir—$SiO_2$—$Li_2O$ | 20.8 |
| Ta | Ti—$SiO_2$—$Li_2O$ | 20.7 |
| NiTa | Ru—$SiO_2$—$Li_2O$ | 21.8 |
| NiTa | Rh—$SiO_2$—$Li_2O$ | 21.6 |
| NiTa | Pt—$SiO_2$—$Li_2O$ | 21.0 |

TABLE 8-continued

| Second Underlayer | First Underlayer | SNRm (dB) |
|---|---|---|
| NiTa | Pd—SiO$_2$—Li$_2$O | 21.1 |
| NiTa | Ir—SiO$_2$—Li$_2$O | 20.9 |
| NiTa | Ti—SiO$_2$—Li$_2$O | 20.9 |
| NiNb | Ru—SiO$_2$—Li$_2$O | 21.9 |
| NiNb | Rh—SiO$_2$—Li$_2$O | 21.7 |
| NiNb | Pt—SiO$_2$—Li$_2$O | 21.3 |
| NiNb | Pd—SiO$_2$—Li$_2$O | 21.0 |
| NiNb | Ir—SiO$_2$—Li$_2$O | 21.0 |
| NiNb | Ti—SiO$_2$—Li$_2$O | 20.7 |

Table 8 indicates that each of the underlayers is preferable since they provide excellent SNRm values. A similar trend was observed when Na$_2$O, K$_2$O, Rb$_2$O, Cs$_2$O, CaO, SrO, or BaO was added instead of Li$_2$O as an additive to the first underlayer.

Furthermore, the effect of improving SNRm by the additive to the first underlayer described above was similarly observed when Na$_2$O, K$_2$O, Rb$_2$O, Cs$_2$O, CaO, SrO or BaO was used in the magnetic recording layer instead of Li$_2$O.

Next, magnetic storage media with SiO$_2$+Li$_2$O having the structures listed in the following Table 9 were made and evaluated in a manner similar to the above example, except that a third underlayer was provided between the second underlayer and the soft magnetic layer The SNRm values when the amount of additive a=0.05 and b=0.05 are listed in Table 9.

TABLE 9

| Third Underlayer | Second Underlayer | First Underlayer | SNRm (dB) |
|---|---|---|---|
| Ta | Pt | Ru—SiO$_2$—Li$_2$O | 22.0 |
| Ta | Pd | Ru—SiO$_2$—Li$_2$O | 21.8 |
| Ta | Ir | Ru—SiO$_2$—Li$_2$O | 21.6 |
| Ta | Ti | Ru—SiO$_2$—Li$_2$O | 21.6 |
| Ta | Pt | Rh—SiO$_2$—Li$_2$O | 21.6 |
| Ta | Pd | Rh—SiO$_2$—Li$_2$O | 21.7 |
| Ta | Ir | Rh—SiO$_2$—Li$_2$O | 21.6 |
| Ta | Ti | Rh—SiO$_2$—Li$_2$O | 21.5 |
| NiTa | Pt | Ru—SiO$_2$—Li$_2$O | 22.1 |
| NiTa | Pd | Ru—SiO$_2$—Li$_2$O | 22.1 |
| NiTa | Ir | Ru—SiO$_2$—Li$_2$O | 21.9 |
| NiTa | Ti | Ru—SiO$_2$—Li$_2$O | 21.8 |
| NiTa | Pt | Rh—SiO$_2$—Li$_2$O | 21.7 |
| NiTa | Pd | Rh—SiO$_2$—Li$_2$O | 21.9 |
| NiTa | Ir | Rh—SiO$_2$—Li$_2$O | 21.9 |
| NiTa | Ti | Rh—SiO$_2$—Li$_2$O | 21.9 |
| NiNb | Pt | Ru—SiO$_2$—Li$_2$O | 22.2 |
| NiNb | Pd | Ru—SiO$_2$—Li$_2$O | 22.0 |
| NiNb | Ir | Ru—SiO$_2$—Li$_2$O | 21.8 |
| NiNb | Ti | Ru—SiO$_2$—Li$_2$O | 21.9 |
| NiNb | Pt | Rh—SiO$_2$—Li$_2$O | 21.8 |
| NiNb | Pd | Rh—SiO$_2$—Li$_2$O | 21.8 |
| NiNb | Ir | Rh—SiO$_2$—Li$_2$O | 21.6 |
| NiNb | Ti | Rh—SiO$_2$—Li$_2$O | 21.5 |

This table indicates that each of the underlayers is preferable since they provide excellent SNRm values. A similar trend was observed when Cr$_2$O$_3$, TiO2, or TiO was used as an additive to the first underlayer.

Furthermore, the effect of improving SNRm by the additive to the first underlayer described above was similarly observed when Na$_2$O, K$_2$O, Rb$_2$O, Cs$_2$O, CaO, SrO or BaO was used in the magnetic recording layer instead of Li$_2$O.

A perpendicular magnetic recording medium according to the present invention can provide a perpendicular magnetic recording medium in which the read/write performances of the perpendicular magnetic recording medium is improved, the diameter of magnetic crystal particles are reduced, and an excellent SNR performance is achieved without having the deteriorated crystallinity and orientation of the magnetic crystal particles, and a magnetic read/write apparatus using the same.

INDUSTRIAL APPLICABILITY

As an application of the present invention, a perpendicular magnetic recording medium of the present invention can be applicable to a magnetic recorder which has a narrow magnetic track width of 0.25 µm and a track width of 0.15 µm, and exhibiting an excellent output of read signal and a high track recording density.

The invention claimed is:

1. A perpendicular magnetic recording medium comprising:
    a substrate;
    at least one underlayer formed above the substrate; and
    a perpendicular magnetic recording layer formed above the at least one underlayer, an easy magnetization axis of the perpendicular magnetic recording layer being oriented perpendicular to the substrate, the at least one underlayer has a granular structure including metal particles and grain boundaries surrounding the metal particles and the perpendicular magnetic recording layer including magnetic crystal particles and grain boundaries surrounding the magnetic crystal particles,
    wherein the granular underlayer contains Ru as the metal particles and the grain boundaries of the metal particles contain silicon oxide and an oxide of at least one element selected from the group consisting of Li, Na, K, Rb and Cs
    the magnetic crystal particles contain Co as the main component and further contain Pt and Cr and the grain boundaries contain an oxide of silicon and an oxide of at least one element selected from the group consisting of Li, Na, K, Rb, and Cs, and
    the total amount of silicon oxide and at least one oxide of Li, Na, K, Rb, and Cs in the granular underlayer is no less than 1 mol% and no more than 20 mol%
    wherein a ratio of total amount of one oxide of Li, Na, K, Rb, and Cs contained at the grain boundaries in the perpendicular magnetic recording layer is no less than 1 mol% and no more than 30 mol% based on the total moles of the oxides of silicon and Li, Na, K, Rb, and Cs contained at the grain boundaries.

2. The perpendicular magnetic recording medium according to claim 1, wherein the at least one underlayer comprises said granular underlayer and further comprises a second underlayer that contains at least one element selected from the group consisting of Ru, Ti, Rh, Pt, Pd, and Ir as a main component.

3. The perpendicular magnetic recording medium according to claim 1, wherein the at least one underlayer comprises said granular underlayer and further comprises a second underlayer that is made of non-magnetic crystal particles containing at least one element selected from the group consisting of Ru, Ti, Rh, Pt, Pd, and Ir as a main component, and grain boundaries surrounding the non-magnetic crystal particles, and
    the grain boundaries contain an oxide of at least one element selected from the group consisting of Si, Cr, and Ti.

4. The perpendicular magnetic recording medium according to claim 3, wherein the grain boundaries in the second underlayer contain an oxide of silicon and at least one element selected from the group consisting of Li, Na, K, Rb, and Cs.

5. The perpendicular magnetic recording medium according to claim 4, wherein the total amount of silicon oxide and at least one oxide of Li, Na, K, Rb, and Cs in the second underlayer is no less than 1 mol% and no more than 20 mol%.

6. The perpendicular magnetic recording medium according to claim 4, wherein a ratio of total amount of oxides of Li, Na, K, Rb, and Cs contained at the grain boundaries in the second underlayer is no less than 1 mol% and no more than 30 mol% based on the total moles of the oxides of silicon and Li, Na, K, Rb, and Cs contained at the grain boundaries of the second underlayer.

7. A magnetic read/write apparatus comprising the perpendicular magnetic recording medium according to claim 1 and a read/write head.

8. The magnetic read/write apparatus according to claim 7, wherein the read/write head is a single magnetic pole recording head.

9. The perpendicular magnetic recording medium according to claim 1, wherein the ratio of total amount of oxides of Li, Na, K, Rb, and Cs contained at the grain boundaries in the granular underlayer is no less than 1 mol% and no more than 30 mol% based on the total moles of the oxides of silicon and Li, Na, K, Rb, and Cs contained at the grain boundaries of the granular underlayer.

* * * * *